US005698053A

United States Patent [19]
Carroll et al.

[11] Patent Number: 5,698,053
[45] Date of Patent: Dec. 16, 1997

[54] METHOD OF FORMING A GLASS AND PLASTIC LAMINATE

[75] Inventors: Wendy R. Carroll, Pittsburgh; Bruce A. Bartrug, Lower Burrell, both of Pa.

[73] Assignee: PPG Industries, Inc., Pittsburgh, Pa.

[21] Appl. No.: 491,389

[22] Filed: Jun. 16, 1995

[51] Int. Cl.$^6$ ................................................. B32B 31/04
[52] U.S. Cl. ........................... 156/103; 156/104; 156/286; 156/212
[58] Field of Search ........................ 156/102, 103, 156/104, 105, 285, 286, 307.7, 212

[56] References Cited

U.S. PATENT DOCUMENTS

| | | | |
|---|---|---|---|
| 3,281,296 | 10/1966 | Jameson | 156/104 |
| 3,311,517 | 3/1967 | Keslar et al. | 156/104 |
| 3,769,133 | 10/1973 | Halberschmidt et al. | 156/286 |
| 3,900,673 | 8/1975 | Mattimoe et al. | 428/339 |
| 3,917,503 | 11/1975 | Tamura | 156/382 |
| 4,671,838 | 6/1987 | Bravet et al. | 156/246 |
| 4,793,878 | 12/1988 | Giorgio et al. | 156/102 |
| 4,902,879 | 2/1990 | Walters et al. | 219/522 |
| 4,988,398 | 1/1991 | Pereman et al. | 156/64 |
| 5,082,515 | 1/1992 | Cartier et al. | 156/212 |
| 5,250,146 | 10/1993 | Horvath | 156/581 |
| 5,264,058 | 11/1993 | Hoagland et al. | 156/102 |
| 5,294,272 | 3/1994 | Peterson et al. | 156/85 |
| 5,364,487 | 11/1994 | Friske et al. | 156/309.9 |

FOREIGN PATENT DOCUMENTS 0 600 766 A1  6/1994  European Pat. Off. .

OTHER PUBLICATIONS

"All–Around Protection", DuPont SentryGlas® Intrusion Resistant Composite.

*Motor Vehicle Safety Standard No. 205*, "Glazing Materials", Jun. 1972.

*Primary Examiner*—Michael W. Ball
*Assistant Examiner*—Michael A. Tolin
*Attorney, Agent, or Firm*—Andrew C. Siminerio

[57] ABSTRACT

A plastic ply having at least one thermoplastic layer is positioned on a major surface of a glass ply to form a preliminary assembly, with the thermoplastic layer contacting selected portions of the major surface of the glass ply. A rigid press plate is placed on the plastic ply with the plate contacting a substantial portion of the plastic ply. Air is then removed from between the plastic and glass plies. After de-airing, the press plate is removed from the preliminary assembly and the preliminary assembly is subjected to elevated temperatures and pressures sufficient to intimately secure the plastic ply to the glass ply and form a laminate. If desired, the preliminary assembly and press plate may be heated to a temperature sufficient to soften the thermoplastic layer of the plastic ply while removing air from between the plastic and glass plies.

16 Claims, 1 Drawing Sheet

_5,698,053_

METHOD OF FORMING A GLASS AND PLASTIC LAMINATE

BACKGROUND OF THE INVENTION

This invention relates to the manufacture of vehicle transparencies and in particular to a method of producing a glass/plastic transparent laminate.

In motor vehicles, the windshield is typically the only laminated transparency in the vehicle. The laminated structure generally includes two glass plies secured together by a polyvinyl butyral interlayer. When impacted by an object, the windshield retains its overall structural integrity and reduces the occurrence of flying glass resulting from glass breakage. In addition, in the event of an accident, the windshield helps retain an occupant within the vehicle. These types of characteristics have been expanded to other transparencies in a vehicle. Glass/plastic laminates are being considered for use to improve occupant retention in the event of an accident, enhance security of the vehicle passengers and reduce the occurrence of vehicle break-in. These transparencies may incorporate one or more glass plies with a multilayered plastic ply comprised of an energy absorbing, adhesive sheet and a tough, tear-resistant sheet as disclosed in U.S. Pat. No. 3,900,670 to Mattimoe et al. and U.S. Pat. No. 5,250,146 to Horvath. In these patents, the plastic ply combines a polyvinyl butyral sheet with a polyester film. The polyvinyl butyral layer adheres the polyester layer to the glass and provides energy absorption in the event the assembly is impacted. The glass fragments will generally remain adhered to the polyvinyl butyral layer. The polyester layer is a tougher film than the polyvinyl butyral sheet and forms a protective barrier between the vehicle occupant and the broken glass.

Manufacture of these types of structures typically includes positioning a plastic layer on a glass sheet with the adhesive ply contacting the sheet's major surface. A rigid press plate having the curvature that generally complements the covered glass surface is positioned on the plastic layer to preserve the optical quality of the plastic surface during the manufacturing process. The air is then removed from between the plies. This de-airing (or degassing) operation may be accomplished by sealing the structure within a vacuum bag, as disclosed in U.S. Pat. No. 3,311,517 to Keslar et al. and air is drawn from the bag. After de-airing, the bagged assembly is subjected to an elevated temperature and pressure to laminate the glass and plastic plies into a single integral unit. After lamination, assembly is removed from the bag, the plate is removed from the final laminated assembly and the vacuum bag is discarded.

As an alternative to the above, the glass, plastic and the press plate assembly may be positioned between a pair of press faces which simultaneously applies heat and pressure to the assembly to de-air and laminate the plies as disclosed in U.S. Pat. No. 5,250,146.

A disadvantage of these types of arrangements is that the processes are cost and labor intensive or may require the use of additional specialized equipment. More specifically, a press plate is required during the entire de-airing and laminating operation. In laminating operations that use vacuum bags, these bags are generally not reusable. Operations that simultaneously de-air and laminate may require heated press faces. Furthermore, it is critical that no dirt or other debris be between the plastic ply and the press plate because such an occurrence will result in an optical defect in the plastic surface of the final laminated assembly.

It would be advantageous to make a glass and plastic laminated assembly without using a press plate in the final laminating operation.

SUMMARY OF THE INVENTION

The present invention provides a method of forming a glass and plastic laminate without the use of a press plate in the final laminating step. A plastic ply having at least one thermoplastic layer is positioned on a major surface of a glass ply to form a preliminary assembly, with the thermoplastic layer contacting selected portions of the major surface of the glass ply. A rigid press plate is placed on the plastic ply with the plate contacting a substantial portion of the plastic ply. Air is then removed from between the plastic and glass plies. After this de-airing step, the press plate is removed from the preliminary assembly and the preliminary assembly is subjected to elevated temperatures and pressures sufficient to intimately secure the plastic ply to the glass ply and form a laminate. If desired, the preliminary assembly and press plate may be heated to a temperature sufficient to soften the thermoplastic layer of the plastic ply while removing air from between the plastic and glass plies. In one particular embodiment of the invention, the plastic ply is a multilayered ply with at least one polyvinyl butyral layer and at least one polyester layer. The positioning step positions the polyvinyl butyral layer in contact with the major surface of said glass ply.

DETAIL DESCRIPTION OF THE INVENTION

Figure 1:
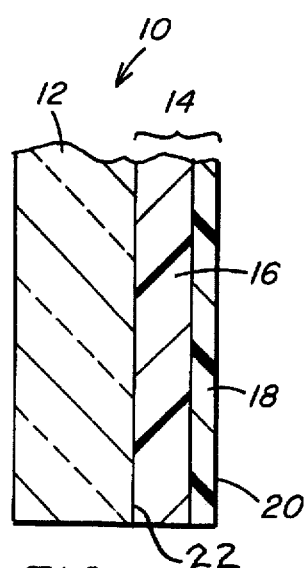
FIG. 1 is a cross section of a glass/plastic assembly of the type made by the process of the present invention.

FIG. 1 illustrates a glass and plastic assembly 10 produced using the teachings of the present invention. Glass sheet 12 is a monolithic glass ply that has been formed to the desired curvature. If desired, the sheet 12 may be heat treated to impart at least a partial temper in the sheet. Plastic ply 14 is a multilayered composite ply. In one particular assembly 10, ply 14 is an antispall, plastic composite available from DuPont Advanced Glazing Products, Delaware, and sold under the tradename SentryGlas® intrusion resistant composite. This material is comprised of a polyvinyl butyral sheet 16 and a polyester film 18. The exposed major surface of the polyester film 18 is coated with a polysiloxane hard coating 20 to provide abrasion resistance.

Figure 3:
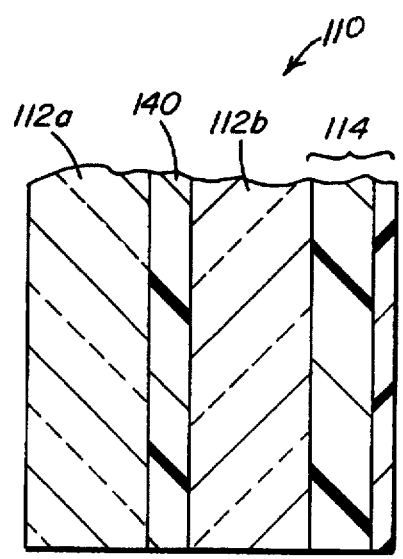
FIG. 3 is an alternate embodiment of a glass and plastic laminate made using the teachings of the present invention.

Although the embodiment of the assembly 10 illustrated in FIG. 1 shows a monolithic glass ply, it should be appreciated that one or more additional rigid transparent plies may be secured to glass ply 12. For example, FIG. 3 illustrates an assembly 110 wherein a multilayered plastic ply 114 is laminated to a multilayered rigid transparent substrate 112. In this particular embodiment, substrate 112 includes glass plies 112a and 112b laminated together by a polyvinyl butyral ply 140. Plies 112a and 112b may be laminated to form substrate 112 either prior to or simultaneously with the laminating of ply 114 to substrate 112 to form assembly 110. It should be further appreciated that rigid plastic plies, for example polycarbonate plies, may be used in place of one or both of the glass plies 112a and 112b.

The present invention provides a method for manufacturing the assembly 10 in a manner which does not require the use of vacuum bags or heated press faces in the final laminating operation and further utilizes a press plate during only a portion of the manufacturing operation. More particularly, the surface 22 of the glass ply 12 is cleaned and covered with composite plastic ply 14 to form a preliminary assembly. Ply 14 is positioned such that its adhesive portion is in contact with surface 22. A press plate, which has a curvature which generally complements the curved configuration of surface 22 of glass ply 12, is positioned on the plastic ply 14. The press plate, which provide smooth rigid surface which protects the plastic ply during the de-airing portion of the laminating operation, may be another glass ply, a metal or plastic ply, or any other type of material that provides a hard surface to contact the plastic ply 14. Although not critical, it is preferred that dirt and debris be removed from the major surfaces of the plastic ply and press plate which are in contact with each other. If desired, the press plate may be taped to the glass ply 12 of the preliminary assembly to hold all the plies together. The preliminary assembly is then de-aired in one of several methods well known in the art. For example, the preliminary assembly and press plate may be pressed together to squeeze the assembly and expel trapped air from between plies 12 and 14. This may be accomplished by heating the preliminary assembly and press plate and passing them between a set of pressing rolls as disclosed in U.S. Pat. No. 4,988,398 to Pereman et al. This heating and roll pressing procedure is typically repeated with the first heating and pressing operation used to de-air the preliminary assembly and the second heating and pressing operation used to seal the peripheral edge of the plastic ply 14 to a corresponding portion of the glass ply 12. The heating operation softens the adhesive portion of the plastic ply 14 allowing it to stick to the glass ply and flow along the glass as the press plate and preliminary assembly pass between the pressing roll and the plastic ply is squeezed between the press plate and glass plate. The press plate provide smooth rigid surface so that as the plastic flows, it does not optically distort the assembly. In addition, the press plate helps to distribute the pressure applied by the rolls evenly along the preliminary assembly.

As an alternative, the preliminary assembly and press plate may be placed between a pair of flexible air impervious blankets, as disclosed in U.S. Pat. No. 3,769,133 to Halberschmidt et al. and U.S. Pat. No. 3,917,503 to Tamura et al. The assembly is heated to a glass temperature of about 260°–270° F. (127°–132° C.) and air is drawn from between the blankets to de-air the preliminary assembly.

As another alternative, vacuum channels, as disclosed in U.S. Pat. No. 3,286,296 to Jameson, may also be used to de-air the preliminary assembly. More particularly, a flexible rubber channel is fitted about the periphery of the preliminary assembly and a vacuum is drawn through a groove along an inner surface of the channel. The groove is generally aligned with the glass/plastic interface of the assembly. The preliminary assembly is then heated to a temperature sufficient to soften the adhesive to draw air out from between the plies and seal its periphery.

After de-airing, the press plate is removed and the preliminary assembly is loaded into an air autoclave where it is subjected to a predetermined cycle of heat and pressure to laminate the assembly to intimately secure the plastic ply 14 to the glass ply 12 and form the unitary structure shown in FIG. 1 as assembly 10.

Assemblies 10 were made using the method as disclosed herein, with the glass ply being partially tempered 3.2 mm glass or fully tempered 5.0 mm glass and the plastic ply 14 being DuPont SentryGlas® 3010 composite, which combines a 30 mil (0.762 mm) polyvinyl butyral sheet 16 with a 10 mil (0.254 mm) polyester sheet 18 and a hard coat 20. The plastic ply 14 is laid out on the glass ply 12 with the polyvinyl butyral sheet 16 contacting surface 22 of glass ply 12. A press plate was positioned on the polyester sheet 18 and the preliminary assembly was taped together. The assembly was then de-aired and sealed using heating ovens and pressing rolls as discussed above. The first oven heated the preliminary assembly to a temperature of between about 160° to 175° F. (71° to 79° C.) and the second oven heated the assembly to a temperature of about 230° to 240° F. (110° to 116° C.). The press plate was removed and the preliminary assembly was positioned in a pin rack and loaded into an air autoclave, where it was subjected to the heating and pressure conditions shown in FIG. 2 to form the final assembly 10. More particularly, the pressure is varied from ambient up to about 200 psi ($1.38 \times 10^6$ N/m$^2$) for a first series of predetermined time intervals while the temperature is varied from ambient up to about 305° F. (152° C.) over a second series of predetermined time intervals. This temperature and pressure cycle is similar to that used in laminating conventional glass/plastic/glass windshields. The resulting assembly 10 was an optically clear vehicle transparency that met Federal Motor Vehicle Safety Standard 205.

It should be appreciated that since the method as disclosed herein does not use a press plate or other rigid member to contact the exposed plastic surface during the final laminating operation, any debris on the plastic surface is not pressed into the final assembly. This reduces the occurrence of rejects due to optical defects formed in the plastic sheet's surface during the final laminating step.

Figure 2:
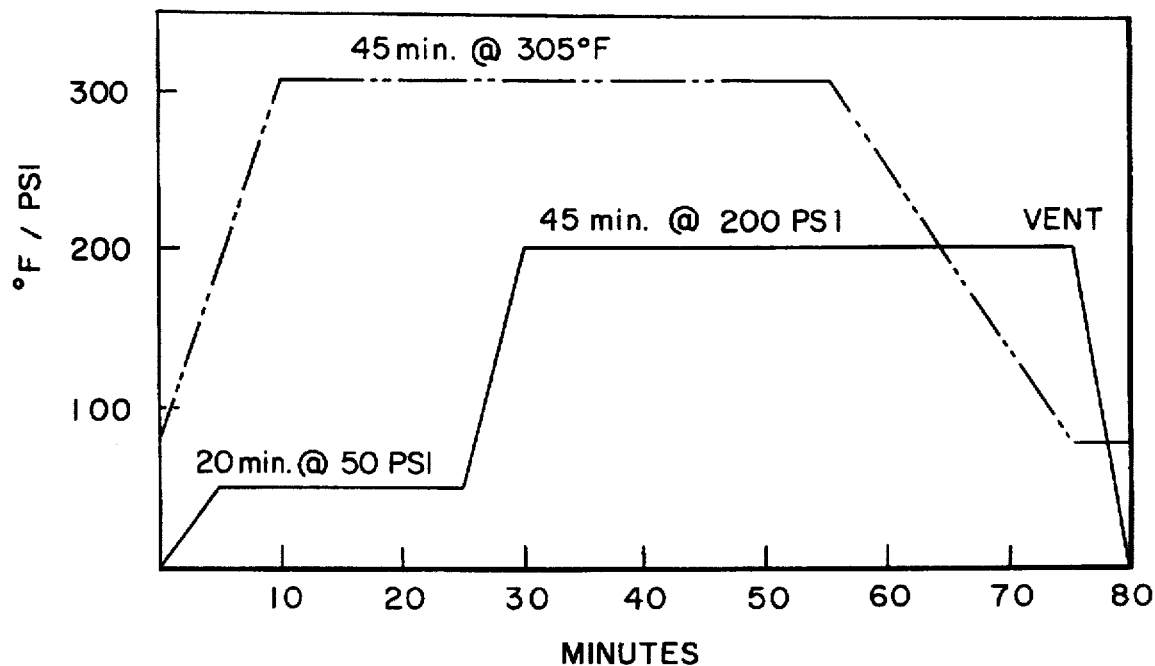
FIG. 2 is an autoclave cycle used in the process of the present invention.

It should be appreciated that the heating and pressure cycle disclosed in FIG. 2 is for the particular glass and plastic configuration disclosed above. Changes in the plastic ply 14, and in particular to the types of materials used in the plastic ply or the thickness of the polyvinyl butyral ply 16 and/or polyester ply 18, will most likely require modifications to the laminating cycle. More particularly, additional samples were made using 5 mm thick glass and DuPont SentryGlas® 1510 and 307 composite. The former material included a 15 mil (0.381 mm) sheet of polyvinyl butyral and a 10 mil (0.254 mm) sheet of polyester and the latter material included a 30 mil (0.782 mm) sheet of polyvinyl butyral and a 7 mil (0.178 mm) sheet of polyester. When assembled, de-aired and sealed using pressing rolls as discussed earlier and laminated using the pressure and temperature cycle as shown in FIG. 2, the resulting assembly was optically inferior to laminates which used the SentryGlas® 3010 composite. It is believed that these inferior optics were due to the particular combination of material thickness in the plastic ply rather than the autoclave cycle.

Because the present invention does not use a press plate during the final autoclave cycle, it is important that the exposed face of plastic ply 14 provide an optically smooth surface that will not flow when exposed to the elevated temperatures of an autoclave operation and deleteriously affect its optical properties. The polyester layer 18 as disclosed herein meets these requirements. It should be appreciated that other combinations of plastic films may provide similar results.

It should be appreciated that the press plate used in the present invention must not stick to the surface of the contacted plastic ply 14. If required, a release agent may be used on the plastic ply 14 and/or press plate to ensure that the plate may be easily removed after de-airing and sealing. In an assembly 10 incorporating a SentryGlas® composite, the hard coat 20 operates as a release agent.

The present invention provides a simplified and cost-effective method for manufacturing a glass plastic transparency. The use of the press plate is limited to the preliminary pressing operation and conventional pressing and autoclave equipment may be used to process the assembly.

We claim:

1. A method of forming a glass and plastic laminate comprising the steps of:

shaping a glass ply to a desired curvature;

positioning an unshaped, flexible plastic ply with at least one thermoplastic layer on a major surface of said glass ply to form a preliminary assembly, said thermoplastic layer contacting selected portions of said major surface of said glass ply and said plastic ply deforming to generally conform to said major surface of said glass ply;

overlaying said plastic ply with a rigid press plate having a curvature that generally compliments said glass ply curvature, wherein said plate contacts a substantial portion of said plastic ply and deforms said plastic ply to generally conform to said major surface of said glass ply;

removing air from between said plastic ply and said glass ply;

removing said press plate from said preliminary assembly; and subjecting said preliminary assembly without said press plate to elevated temperatures and pressures sufficient to intimately secure said plastic ply to said glass ply and form a laminate.

2. The method as in claim 1 further including the step of heating said preliminary assembly and press plate to a temperature sufficient to soften said thermoplastic layer of said plastic ply while removing air from between said plastic ply and said glass ply.

3. The method as in claim 1 wherein said air removing step includes the steps of heating said preliminary assembly and press plate to a temperature sufficient to soften said thermoplastic layer of said plastic ply and squeezing said plastic ply between said glass ply and said press plate.

4. The method as in claim 3 wherein said squeezing step includes passing said preliminary assembly and said press plate between at least one pair of upper and lower pressing rolls.

5. The method as in claim 1 wherein said air removing step includes the steps of securing a vacuum channel about the periphery of said preliminary assembly and press plate, drawing a vacuum through said channel to remove air from between said plastic ply and said glass while heating said preliminary assembly and press plate to a temperature sufficient to soften said thermoplastic layer of said plastic.

6. The method as in claim 1 wherein said air removing step includes the steps of positioning said preliminary assembly and press plate between a pair of air impervious blankets and drawing a vacuum between said blankets to remove air from between said plastic ply and said glass while heating said preliminary assembly and press plate to a temperature sufficient to soften said thermoplastic layer of said plastic.

7. The method as in claim 1 wherein said subjecting step includes varying said pressure from ambient pressure up to about 200 psi ($1.38 \times 10^6$ N/m$^2$) for a series of predetermined time intervals while varying said temperature from ambient up to about 305° F. (152° C.) over a second series of predetermined time intervals.

8. The method as in claim 1 further including the step of heating said glass ply to impart at least a partial temper prior to said positioning step.

9. The method as in claim 1 wherein said plastic ply is a multilayered ply with at least one polyvinyl butyral layer and at least one polyester layer, and wherein said positioning step positions said polyvinyl butyral layer in contact with said major surface of said glass ply.

10. The method as in claim 1 further including the step of securing at least one additional rigid ply to an opposing major surface of said glass ply.

11. The method as in claim 3 wherein said plastic ply is a multilayered ply with at least one polyvinyl butyral layer and at least one polyester layer, and wherein said positioning step positions said polyvinyl butyral layer in contact with said major surface of said glass ply.

12. The method as in claim 11 wherein said subjecting step includes varying said pressure from ambient pressure up to about 200 psi ($1.38 \times 10^6$ N/m$^2$) for a series of predetermined time intervals while varying said temperature from ambient up to about 305° F. (152° C.) over a second series of predetermined time intervals.

13. The method as in claim 5 wherein said plastic ply is a multilayered ply with at least one polyvinyl butyral layer and at least one polyester layer, and wherein said positioning step positions said polyvinyl butyral layer in contact with said major surface of said glass ply.

14. The method as in claim 13 wherein said subjecting step includes varying said pressure from ambient pressure up to about 200 psi ($1.38 \times 10^6$ N/m$^2$) for a series of predetermined time intervals while varying said temperature from ambient up to about 305° F. (152° C.) over a second series of predetermined time intervals.

15. The method as in claim 6 wherein said plastic ply is a multilayered ply with at least one polyvinyl butyral layer and at least one polyester layer, and wherein said positioning step positions said polyvinyl butyral layer in contact with said major surface of said glass ply.

16. The method as in claim 15 wherein said subjecting step includes varying said pressure from ambient pressure up to about 200 psi ($1.38 \times 10^6$ N/m$^2$) for a series of predetermined time intervals while varying said temperature from ambient up to about 305° F. (152° C.) over a second series of predetermined time intervals.

* * * * *